(12) United States Patent
Kosmicki

(10) Patent No.: US 12,117,018 B2
(45) Date of Patent: Oct. 15, 2024

(54) DRIVE SIDE LINER FOR A CENTRIFUGAL PUMP

(71) Applicant: Weir Slurry Group, Inc., Madison, WI (US)

(72) Inventor: Randy James Kosmicki, Edgerton, WI (US)

(73) Assignee: WEIR SLURRY GROUP, INC., Madison, WI (US)

( * ) Notice: Subject to any disclaimer, the term of this patent is extended or adjusted under 35 U.S.C. 154(b) by 24 days.

(21) Appl. No.: 17/926,814

(22) PCT Filed: May 28, 2021

(86) PCT No.: PCT/AU2021/050520
§ 371 (c)(1),
(2) Date: Nov. 21, 2022

(87) PCT Pub. No.: WO2021/237303
PCT Pub. Date: Dec. 2, 2021

(65) Prior Publication Data
US 2023/0193926 A1      Jun. 22, 2023

Related U.S. Application Data

(60) Provisional application No. 63/032,073, filed on May 29, 2020.

(30) Foreign Application Priority Data

Jun. 29, 2020   (AU) ................................. 2020902180

(51) Int. Cl.
*F04D 29/42*       (2006.01)
*B25B 1/24*        (2006.01)
(Continued)

(52) U.S. Cl.
CPC ........ *F04D 29/4286* (2013.01); *B25B 1/2463* (2013.01); *B25B 27/14* (2013.01);
(Continued)

(58) Field of Classification Search
CPC ....... F04D 29/4286; F04D 7/04; F04D 29/628
See application file for complete search history.

(56) References Cited

U.S. PATENT DOCUMENTS 1,608,547 A * 11/1926 O'Fallon ............... F04D 29/448
                                                            415/196
1,727,703 A *  9/1929 Hause ................. F04D 29/4286
                                                            415/196
(Continued)

FOREIGN PATENT DOCUMENTS

AU        2011223491 B2 *  6/2015 ............. F01D 25/24
CN         102884325 A  *  1/2013 ............. F01D 25/24
(Continued)

*Primary Examiner* — Brian Christopher Delrue
(74) *Attorney, Agent, or Firm* — Morriss O'Bryant Compagni Cannon, PLLC.

(57) ABSTRACT

There is provided a drive side liner for a centrifugal slurry pump, wherein the centrifugal slurry pump includes an outer casing, a main liner and an impeller driven by a drive shaft, wherein the main liner and drive side liner are housed within the outer casing of the centrifugal slurry pump, the drive side liner including: an inner liner portion including a central aperture configured to receive the drive shaft, the drive side liner further including an outer liner portion arranged to surround the inner liner portion, wherein the inner liner portion and the outer liner portion are each configured to removably engage with one another and the outer casing.

11 Claims, 17 Drawing Sheets

(51) Int. Cl.
*B25B 27/14* (2006.01)
*F04D 7/04* (2006.01)
*F04D 29/62* (2006.01)
*F16B 2/10* (2006.01)

(52) U.S. Cl.
CPC ............. *F04D 7/04* (2013.01); *F04D 29/628* (2013.01); *F16B 2/10* (2013.01); *F05D 2230/70* (2013.01)

(56) References Cited

U.S. PATENT DOCUMENTS

| | | | | |
|---|---|---|---|---|
| 1,958,108 | A | * | 5/1934 | Milkowski .......... F04D 29/4286 415/196 |
| 4,527,948 | A | * | 7/1985 | Addie ................. F04D 29/622 415/196 |
| 4,802,818 | A | * | 2/1989 | Wiggins ............... F04D 29/448 415/197 |
| 9,739,285 | B2 | * | 8/2017 | Kosmicki ............. F04D 29/628 |
| 10,323,652 | B2 | * | 6/2019 | Walker ................ F04D 29/4286 |
| 2003/0205176 | A1 | * | 11/2003 | Kolody ................ A61G 13/101 108/28 |
| 2004/0096316 | A1 | * | 5/2004 | Simon .................. F01D 17/162 415/151 |
| 2006/0125166 | A1 | * | 6/2006 | Gerritsen .............. B25B 5/068 269/6 |
| 2007/0160465 | A1 | * | 7/2007 | Roudnev .............. F04D 29/167 415/170.1 |
| 2011/0142599 | A1 | * | 6/2011 | Burgess ................ F04D 29/08 415/127 |
| 2013/0202426 | A1 | * | 8/2013 | Walker .................. F04D 29/44 415/203 |
| 2015/0240837 | A1 | * | 8/2015 | Glaves .................... B66C 1/44 415/196 |
| 2017/0045057 | A1 | * | 2/2017 | Walker .................. F04D 29/44 |

FOREIGN PATENT DOCUMENTS

| | | | | |
|---|---|---|---|---|
| GB | 2059908 | A | | 4/1981 |
| GB | 2555560 | A | * | 5/2018 ............. F01D 11/08 |
| WO | 2013070203 | A2 | | 5/2013 |
| WO | 2019111100 | A1 | | 6/2019 |

* cited by examiner

DRIVE SIDE LINER FOR A CENTRIFUGAL PUMP

TECHNICAL FIELD

This disclosure relates generally to centrifugal slurry pumps and components or parts for use in such pumps. The components or parts of particular interest are pump impellers, and pump liners including main liners as well as side liners. Slurries are usually a mixture of liquid and particulate solids, and are commonly found in hydro-transport, minerals processing, sand and gravel and/or dredging industry.

BACKGROUND

In one typical form centrifugal slurry pumps generally include an outer housing that encases an inner liner. The inner liner may include a main liner (sometimes referred to as a volute liner) and two side liners. The inner liners are generally formed from hard metals or elastomers. The outer housing and inner liners are configured with a pumping chamber therein. The main liner has openings on opposite sides thereof, one of which provides an inlet to the pumping chamber. The other outlet is a discharge outlet that is provided at the periphery of the main liner and may, for example, extend generally in a tangential direction from the periphery of the main liner. An impeller is mounted within the pumping chamber for rotation about an axis of rotation.

A drive shaft is operatively connected to the impeller for causing the rotation thereof. The drive shaft is disposed to one side of the outer housing and main liner. This is often referred to as the rear or drive side of the pump. Further, the above referred inlet is disposed on other side of the outer housing and liner from the drive side. That is, the inlet is disposed on a suction side of the pump, where the suction side is often referred to as the front of the pump. The inlet is typically coaxial with the impeller rotation axis.

One of the side liners is located at the suction side of the pump and is sometimes described as the suction side liner, front liner plate or throatbrush. The suction side liner is provided to the pump inlet and may typically include a sidewall, which extends laterally with respect to the impeller rotation axis and an inlet conduit which extends from the side wall, the inlet conduit being arranged generally co-axially with the impeller rotation axis. In applications where the pump is of the type referred to as a horizontal slurry pump, the inlet conduit is disposed generally horizontally when in use.

The other side liners is located on the drive side of the pump and thus is referred to as the drive side liner. Alternately, the drive side liner may also be referred to as a rear side liner, a back side liner, a frame plate liner or frame plate liner insert. The drive side liner includes a generally circular disc-like body arranged such that, when in use, one side of the liner faces the impeller and the other side faces a drive shaft seal assembly, which may include a seal housing and seal chamber. The seal assembly may include a main seal which may be in the form of a stuffing box. The suction side liner also includes a central passageway through which the drive shaft passes.

The impeller typically includes a hub to which a drive shaft is operatively connected and at least one shroud. Pumping vanes are provided on one side of the shroud with discharge passageways between adjacent pumping vanes. In one form of impeller, two shrouds are provided with pumping vanes being disposed therebetween. The pumping vanes include a leading edge portion in the region of the inlet and a trailing edge portion in the region of the outlet typically near the outer peripheral edge of the shroud. The impeller further includes an eye portion which extends from one side of a shroud and is adjacent the pumping vanes leading edges and generally in the region of the impeller rotation axis. In one form, when assembled the hub is at least partially disposed within the central passageway of the back side liner.

Because of the abrasive nature of slurries the pump, and in particular the pump components such as the pump impeller and pump liner, are subjected to extreme wear that leads to a significant reduction in the operational life of these components. In operation, the slurry enters the impeller in the region of the centre or eye, and is then flung out to the periphery of the impeller and into the main pump volute liner. Because there is a pressure difference between the liner and the eye, there is a tendency for the slurry to try and migrate into gaps located between the side-liners and the impeller, resulting in high wear on the side-liners.

In order to reduce the driving pressure on the slurry in the gaps, as well as create a centrifugal field to expel particles, slurry pumps often have auxiliary or expelling vanes on the front shroud of the impeller. Auxiliary or expelling vanes may also be provided on the back shroud. The expelling vanes rotate the slurry in the gaps creating a centrifugal field and thus reducing the driving pressure for the returning flow, reducing the flow velocity and thus the wear on the side-liner. The purpose of these auxiliary vanes is to reduce flow re-circulation through the gap. These auxiliary vanes also reduce the influx of relatively large solid particles in these gaps. Much of the wear on the side-liners is a result of the flow generated by the rotating auxiliary vanes. In particular, there is wear from the tip or outer face of the auxiliary vanes due to the creation of fluid vortices and entrained particles.

The rotation of the impeller creates vortices in the slurry. At the drive side of the pump, the slurry is rotating as it enters the seal chamber, which may cause particles to be trapped near the impeller hub. This can cause wear near the shaft seal, which as mentioned earlier may be in the form of a stuffing box. Moreover, some areas of the side-liners experience more wear than others. Such localised wear is problematic as the formation of pockets or recesses in the side-liners create further localised wear. This often means that the side-liners have to be replaced prematurely due to the localised wear pockets in an otherwise functional side-liner.

The preferred embodiments of the present invention seek to address one or more of these disadvantages, and/or to at least provide a useful alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms liner of the common general knowledge in the field of endeavour to which this specification relates.

SUMMARY

This Summary is provided to introduce a selection of concepts in a simplified form that are further described below in the Detailed Description. This Summary is not intended to identify essential features of the claimed subject matter, nor is it intended to be used to limit the scope of the claimed subject matter.

In a first aspect, there is provided a drive side liner for a centrifugal slurry pump, wherein the centrifugal slurry pump includes an outer casing, a main liner and an impeller driven by a drive shaft, wherein the main liner and drive side liner are housed within the outer casing of the centrifugal slurry pump, the drive side liner including: an inner liner portion including a central aperture configured to receive the drive shaft, the drive side liner further including an outer liner portion arranged to surround the inner liner portion, wherein the inner liner portion and the outer liner portion are each configured to removably engage with one another and the outer casing.

In an embodiment, a sealing face of the inner liner portion is arranged to contact a drive shaft seal to form an inner seal.

In another embodiment, the outer liner portion is arranged to be removable from the outer casing and the inner liner portion without compromising the inner seal.

In an embodiment, an outer face of the outer liner portion is arranged to contact the outer casing and/or the main liner to form an outer seal.

In an embodiment, the inner liner portion is arranged to be removable from the drive shaft and the outer liner portion without compromising the outer seal.

In an embodiment, an outer face of the inner liner portion is arranged to contact an inner face of the outer liner portion to form an intermediate seal.

In an embodiment, the inner liner portion includes an inner liner wear face and an inner liner engagement face on opposing sides of the inner liner portion.

In an embodiment, the inner liner wear face is a smooth surface arranged to face the impeller.

In an embodiment, the inner liner engagement face includes at least one inner liner alignment feature arranged to engage with at least one casing alignment feature that, when engaged with one another, align the inner liner portion with respect to the drive shaft.

In an embodiment, the inner liner portion is maintained in alignment with the drive shaft by means of at least one fastener attaching the inner liner portion to the outer casing.

In an embodiment, the outer liner portion includes an outer liner wear face and an outer liner engagement face on opposing sides of the outer liner portion.

In an embodiment, the outer liner wear face is a smooth surface arranged to face the impeller.

In an embodiment, the outer liner engagement face includes at least one outer liner alignment feature arranged to engage with another at least one casing alignment feature that aligns the outer liner portion with respect to the inner liner portion In an embodiment, the outer liner portion is maintained in alignment with the inner liner portion by means of another at least one fastener attaching the outer liner portion to the outer casing.

In an embodiment, the main liner is arranged to align and engage with the outer liner portion and to be maintained in alignment and engagement by means of at least one main liner fastener attaching the main liner to the outer casing.

In another aspect, there is provided a tool for a centrifugal slurry pump for engaging an outer liner portion of a drive side liner as herein described, the tool including: a lifting member: a top arm; and a bottom arm, wherein each arm is arranged to engage along an curved engagement lip provided to the periphery of the outer liner portion.

In an embodiment, the lifting member is further including at least one support bracket that is arranged to contact and support the outer liner wear face when the tool is engaged with the outer liner portion.

BRIEF DESCRIPTION OF FIGURES

Example embodiments are apparent from the following description, which is given by way of example only, of at least one non-limiting embodiment, described in connection with the accompanying figures.

DETAILED DESCRIPTION

Figure 1:
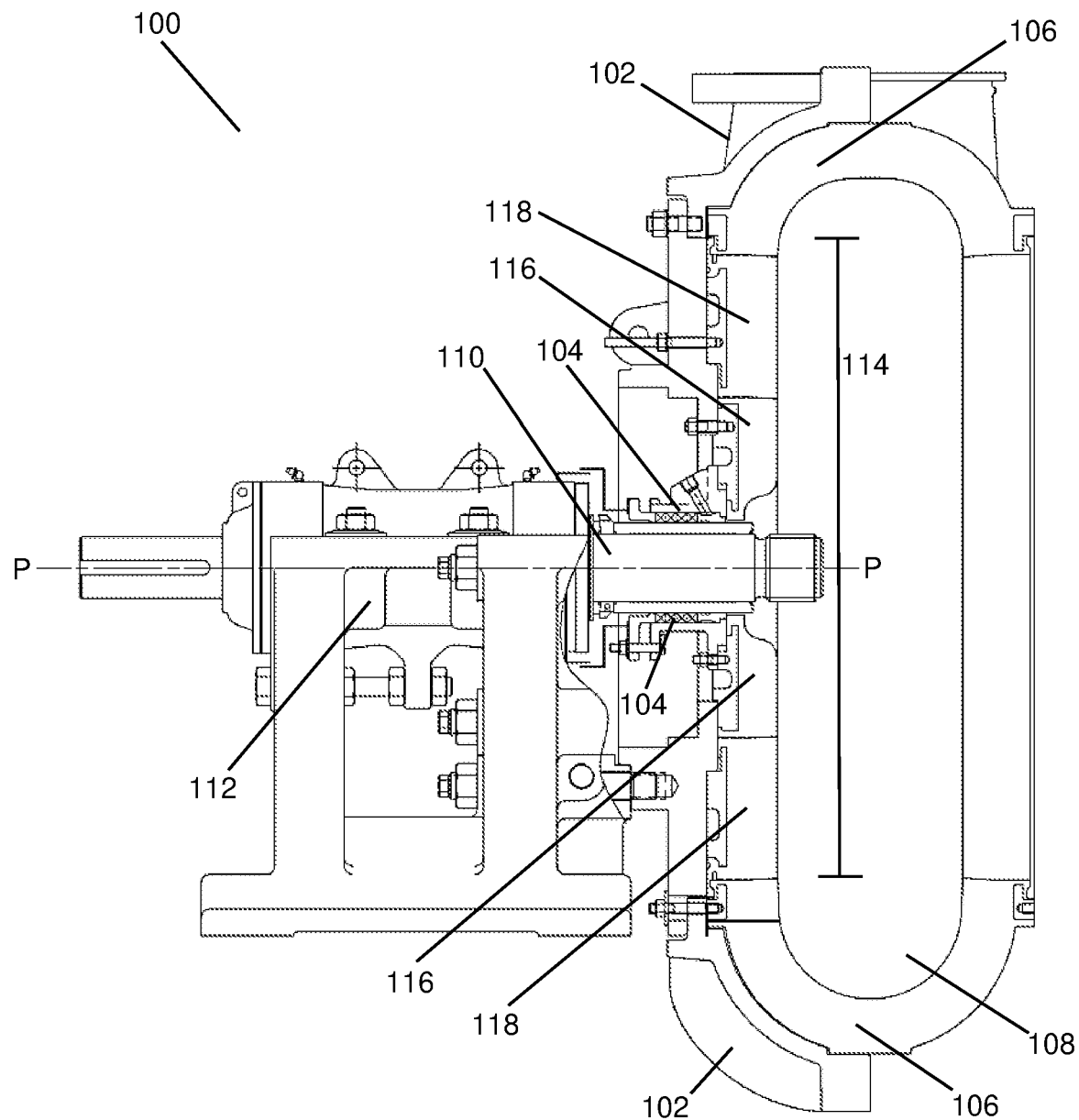
FIG. 1 illustrates a side section view of an embodiment of the present invention.
Figure 2:
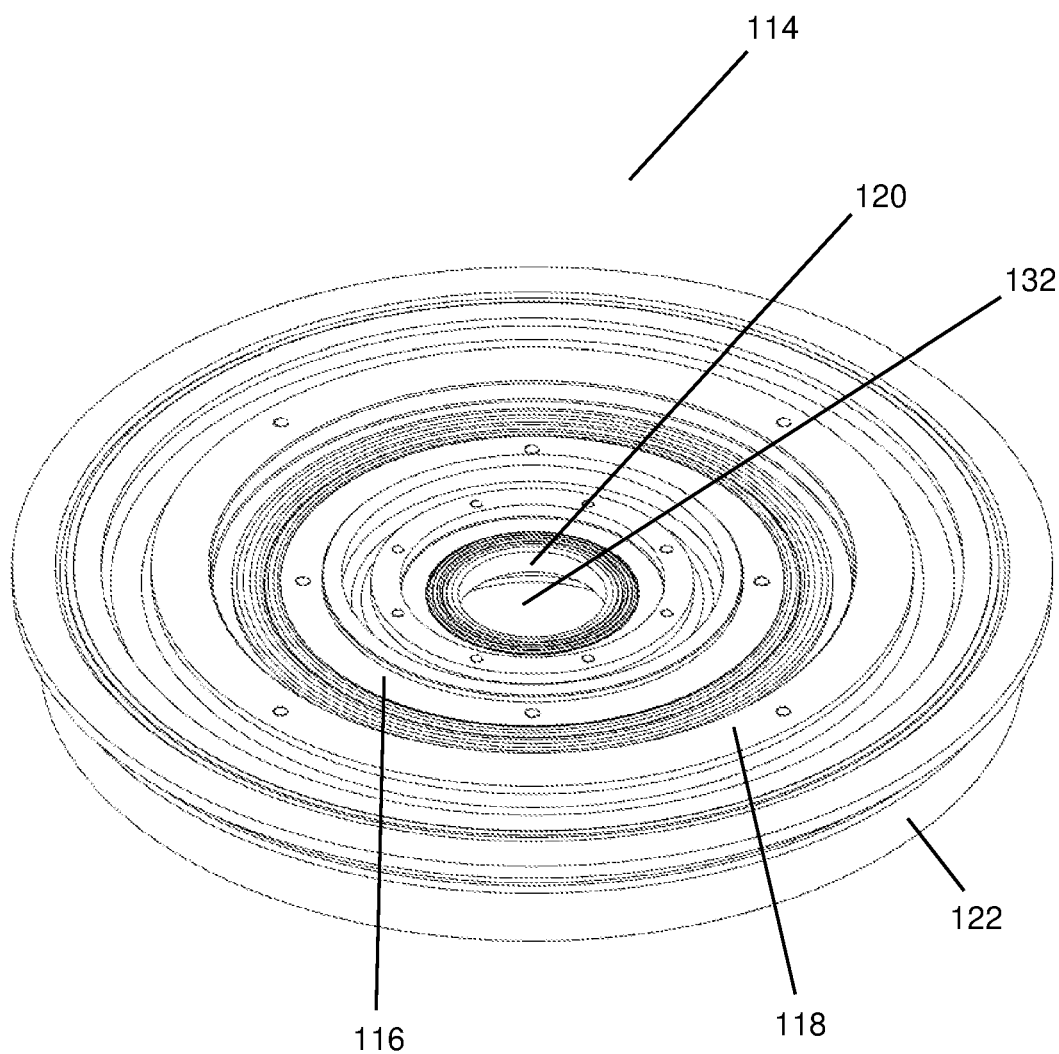
FIG. 2 illustrates a top perspective view of an embodiment of the present invention.
Figure 3:
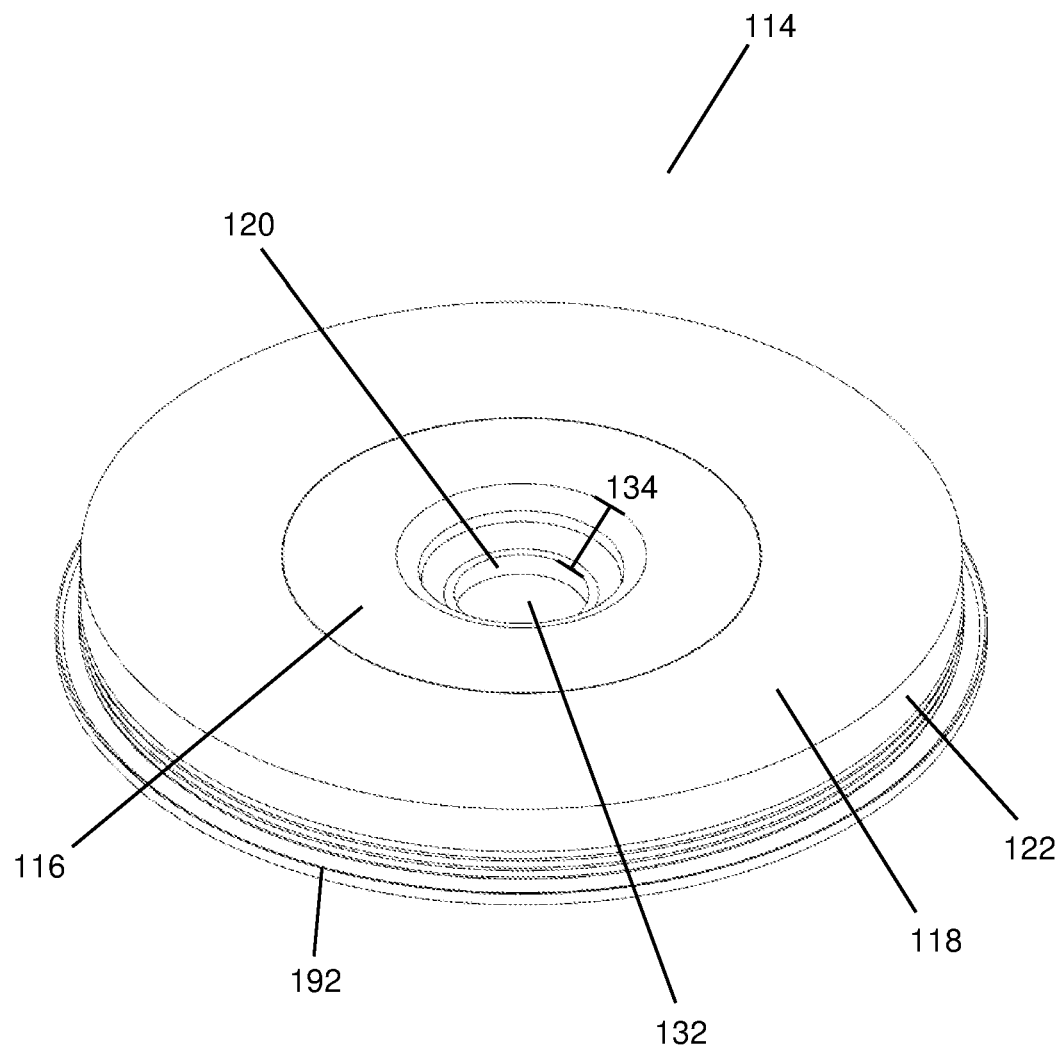
FIG. 3 illustrates a bottom perspective view of an embodiment of the present invention.
Figure 4:
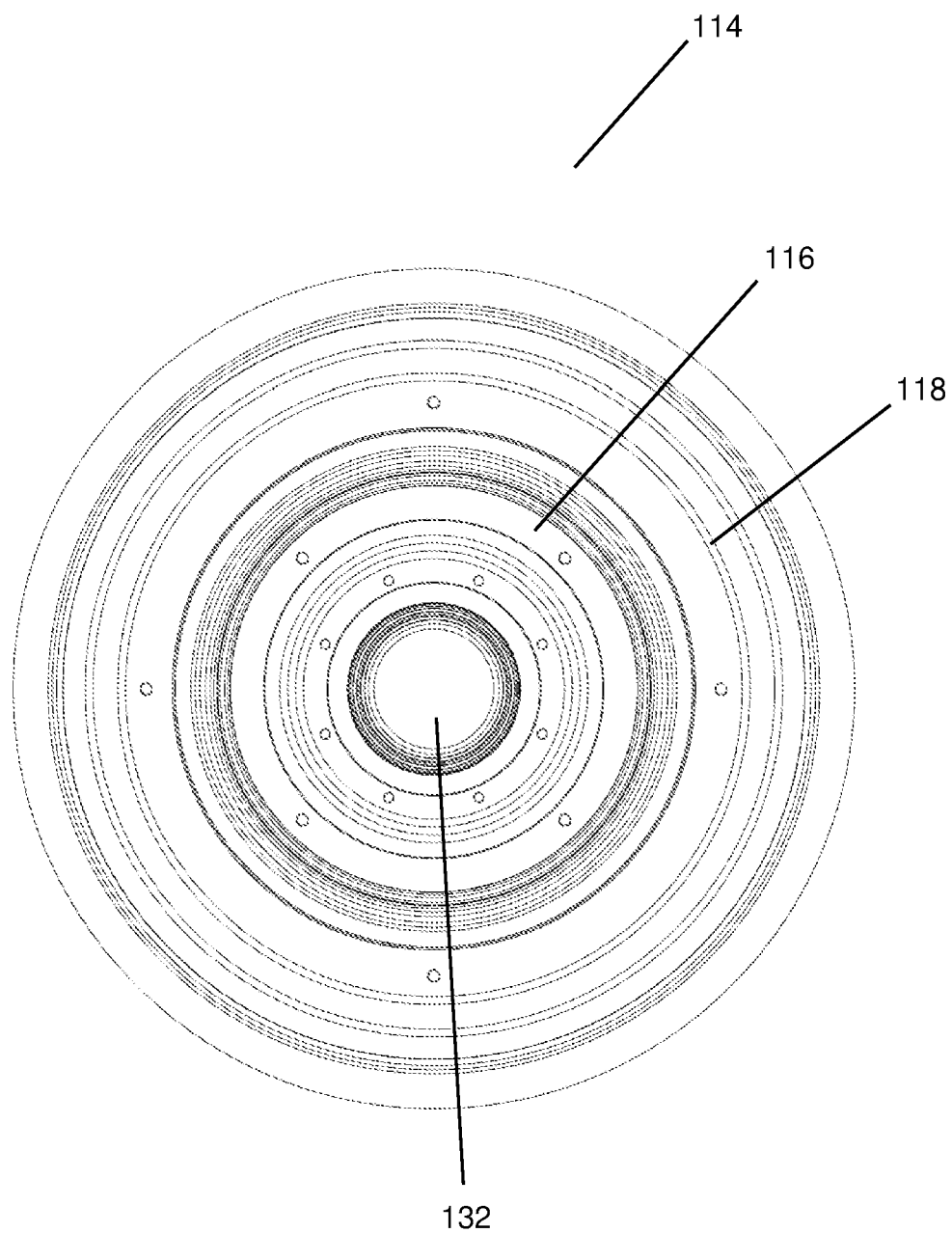
FIG. 4 illustrates a top view of an embodiment of the present invention.
Figure 5:
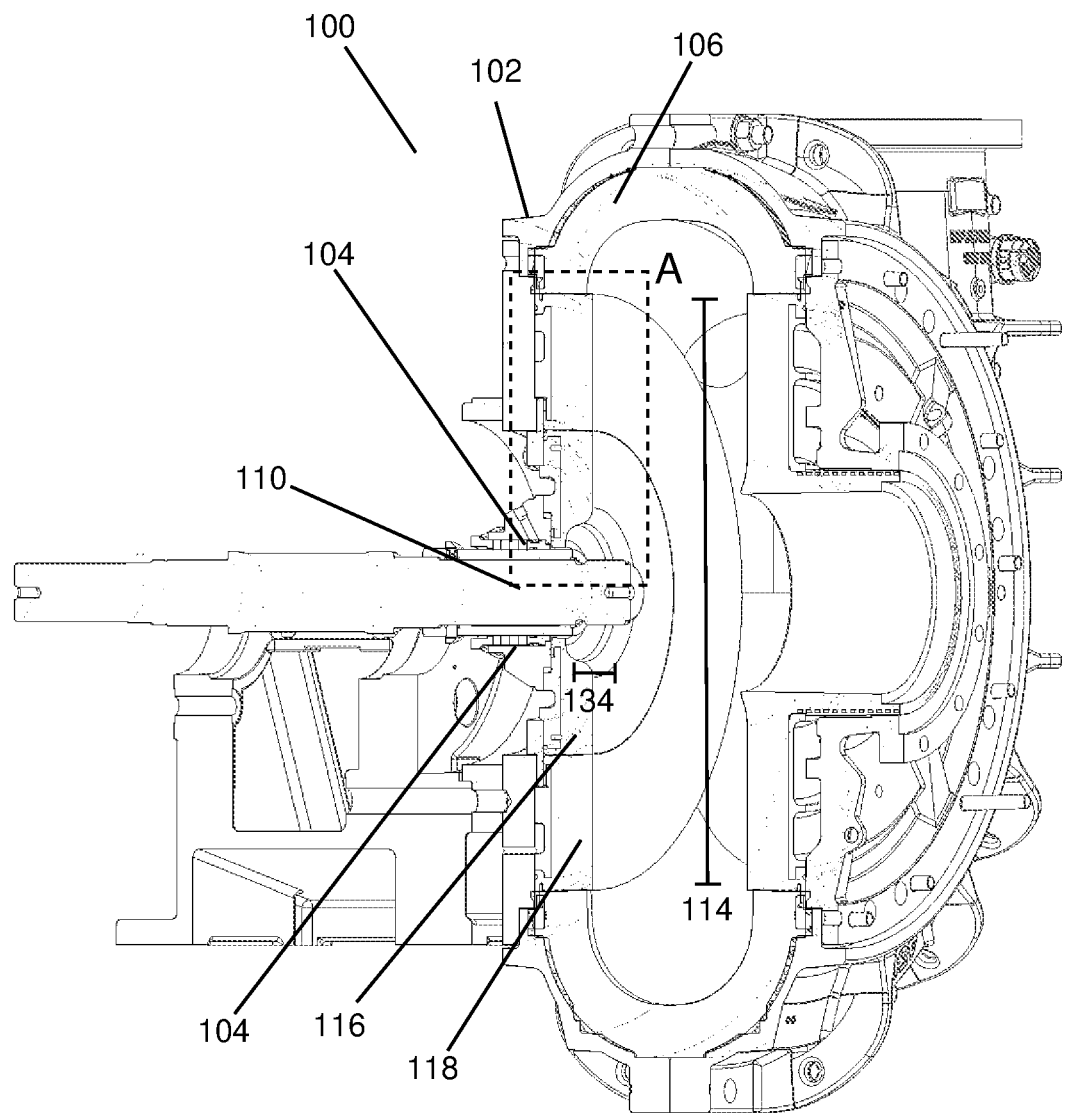
FIG. 5 illustrates a side-on perspective section view of an embodiment of the present invention including an area inside dashed lines denoted area "A".

The following modes, given by way of example only, are described in order to provide a more precise understanding of one or more embodiments. In the figures, like reference numerals are used to identify like parts throughout the figures.

With general reference to FIGS. 1 to 21, the invention is described in relation to a centrifugal slurry pump referred hereafter as "the pump". A general description of a lined pump 100 is provided as follows. The pump 100 may include an outer casing 102, which provides an outer housing for the internal components of the pump 100. The outer casing 102 may be formed from cast or ductile iron. The pump 100 may be supported by a pedestal or base that is attached to the outer casing 102. The outer casing 102 may be formed from two side casing parts, sometimes also known as the frame plate and the cover plate, and which are joined together about their peripheries.

The pump 100 is formed with an inlet hole and a discharge outlet hole. When in use, for example in a process plant, the pump 100 is connected by piping to the inlet hole and to the outlet hole, for example to facilitate pumping of a mineral slurry.

The pump 100 houses various liners, which are provided to an inner surface of the outer casing 102 in order to protect said casing 102 from wear. For example, the outer casing 102 may house a main liner 106 (or volute) and two side liners, where the main liner 106 and the two side liners may be arranged to attach or contact the inner surface of the outer casing 102. The main liner 106 further defines a pump chamber 108 in which an impeller (not shown) is positioned for rotation. The impeller is attached to a drive shaft 110 rotated by a motor 112, where the drive shaft 110 drives the impeller to rotate about an axis within the pump chamber 108 of the pump 100.

Further, the pump 100 may also house a drive side liner 114, which is located proximate to the drive side of the pump 100 (that is, nearest to motor 112 or the drive side). The other side liner is a suction side liner (not shown), which is also known as a front liner or throatbush. The suction side liner is located nearer the front end of the pump 100, which is proximate to the inlet hole or suction side of the pump 100. That is, the suction side liner is located on the opposite side of the impeller to the drive side liner 114.

Referring now to FIGS. 1 to 5, there is provided an embodiment of the drive side liner 114 for the pump 100 having a main liner 106 and an impeller driven by the drive shaft 110, wherein the main liner 106 and drive side liner 114 are housed within the outer casing 102 of the pump 100. The drive side liner 114 may include an inner liner portion 116 arranged to receive the drive shaft 110 and an outer liner portion 118 arranged to surround the inner liner portion 116, wherein the inner liner portion 116 and the outer liner portion 118 are each arranged to removably engage with one another and the outer casing 102.

In an embodiment, the drive side liner 114 is generally shaped in the form of an annular disk wherein the inner liner portion 116 receives the drive shaft 110 through a central aperture 132. The drive side liner 114 may include a sealing face 120 that is arranged to align proximate to the drive shaft 110. Further the sealing face 120 is located around an inner peripheral surface of the inner liner portion 116 surrounding the central aperture 132. The sealing face 120 may be arranged to be in contact with the drive shaft seal 104 in such a way as to form an inner seal. That is, the sealing face 120 is shaped and sized to fit tightly against the drive shaft seal 104 such that an inner seal is formed to prevent slurry from escaping the pump chamber 108 when the pump 100 is in operation and the slurry within is subjected to pressure. However, the sealing face 120 is also formed to not contact the drive shaft 110.

In an embodiment, the outer liner portion 118 of the drive side liner 114 includes an outer face 122 that is located on an outer peripheral surface of the outer liner portion 118. The outer face 122 may be arranged to contact the outer casing 102 and/or the main liner 106 to form an outer seal. That is, the outer face 122 is shaped and sized to fit against the outer casing 102 and/or the main liner 106 such that an outer seal is formed to prevent slurry from escaping the pump chamber 108 and gathering behind the drive side liner 114 and wearing against the outer casing 102 when the pump 100 is in operation and the slurry within is subjected to pressure.

In an embodiment, the outer liner portion 118 may be arranged to be removable from the outer casing 102 and the inner liner portion 116 without compromising the inner seal. For example, the outer liner portion 118 may be removed for replacement, repair or inspection without disturbing the position of the inner liner portion 116. In another embodiment, the inner liner portion 116 may be arranged to be removable from the drive shaft 110 and the outer liner portion 118 without compromising the outer seal. For example, the inner liner portion 116 can be removed for replacement, repair or inspection without disturbing the position of the outer liner portion 118. In other words, each of the inner liner portion 116 and the outer liner portion 118 can be removed from the pump 100 without disturbing the other respective liner portion.

In an embodiment, the inner liner portion 116 and the outer liner portion 118 when aligned and engaged with one another form the drive side liner 114. This engagement occurs along an outer face 124 of the inner liner portion 118 and an inner face 126 of the outer liner portion 118. The outer face 124 of the inner liner portion may be located on an outer peripheral surface of the inner liner portion 118. The inner face 126 of the outer liner portion 118 may be located around an inner peripheral surface of the outer liner portion 118 surrounding a central aperture of the outer portion 118.

The outer face 124 and inner face 126 may include at least a portion of an elastomeric material, such as but not limited to natural rubber, neoprene rubber, or other such elastomers. In an embodiment, the inner liner portion 116 and/or the outer liner portion 118 may be formed from an elastomeric material. Alternatively, the outer face 124 and inner face 126 may include one or more strips or bands of elastomeric material that are moulded into each of the inner liner portion 116 and/or the outer liner portion 118 that may be made from a metal or similar material.

The outer face 124 and inner face 126 are formed to fit tightly together and the elastomeric material of the outer face 124 and inner face 126 compresses together when installed on the drive side of the pump 100, which forms an inter-liner seal within the drive side liner 114. In other words, the outer face 124 and inner face 126 connect together to form an interface between the inner liner portion 116 and the outer liner portion 118. The inter-liner seal is formed to prevent slurry from escaping from the pump chamber 108 by passing between the inner liner portion 116 and the outer liner portion 118 and gathering behind the drive side liner 114 and wearing against the outer casing 102 or the drive shaft 110. However, the outer face 124 and inner face 126 are also formed to allow either one of the inner liner portion 116 or the outer liner portion 118 to be removed without disturbing the other and its seal with the outer casing 102.

In an embodiment, the position of the inner liner portion 116 relative to the outer liner portion 118 along axis P-P may be varied. For example, the position of the outer liner portion 118 may be adjusted relative to a fixed position of the inner liner portion 116 such that an inner liner wear face 128 and an outer liner wear face 135 form a smooth or flush surface.

Alternatively, the position of the outer liner portion 118 may be adjusted such that the outer liner wear face 135 is closer to the suction side of the pump relative to the inner liner wear face 126. Moving the outer liner portion 118 towards the suction side of the pump 100 reduces the space between the drive side liner 114 and the impeller. Variation in the space between the drive side liner 114 and the impeller changes the flow of the slurry within the pump chamber 108. A pump operator may wish to have different sized spaces between the drive side liner 114 and the impeller depending on the pumping variables (slurry viscosity, slurry composition, pump operating speed, etc.) Further, when the outer liner portion 118 is adjustable and the inner side liner portion may be fixed along axis P-P, such an arrangement ensures that optimal pumping chamber 108 flow conditions can be achieved whilst also ensuring the drive shaft seal 104 is not compromised.

Referring now to FIGS. 5 to 13, there is provided an embodiment of the inner liner portion 116 which is in the form of an annular disc shaped body having an inner liner wear face 128 and an inner liner engagement face 130, wherein the inner liner wear face 128 is a smooth surface configured to face the suction side of the pump 100 and the inner liner engagement face 130 is configured to face the drive side of the pump 100. In other words, the inner liner wear face 128 and the inner liner engagement face 130 are on opposing sides of the inner liner portion 116. The inner liner portion 116 further includes a central aperture 132 for receiving the drive shaft 110 and shaft seal 104, where the central aperture 132 extends through the entire body of the inner liner portion 116 and the axis of the central aperture and the inner liner portion 116 is collinear with the axis P-P.

As shown, the inner liner wear face 128 is formed to include a contoured region 134 that joins the inner liner wear face 128 to the sealing face 120. In an embodiment, the contoured region 134 may be frusto-conical in shape to accommodate the impeller hub, drive shaft 110 and the drive shaft seal 104. As such, depending on the type and size of the impeller hub and drive shaft seal 104, the size and gradient of the contoured region 134 may vary. Between the contoured region 134 and the outer face 124 of the inner liner portion 116, the inner liner wear face 128 is a smooth surface arranged to face the suction side and may be generally planar and arranged perpendicular to axis P-P.

Referring now to FIGS. 5, 6 and 14 to 20, there is provided an embodiment of the outer liner portion 118 that is in the form of a generally annular disc shaped body having an outer liner wear face 135 and an outer liner engagement face 136, wherein the outer liner wear face 135 is a smooth surface configured to face the suction side of the pump 100 and the outer liner engagement face 136 is configured to face the drive side of the pump 100. In other words, the outer liner wear face 135 and the outer liner engagement face 136 are on opposing sides of the outer liner portion 118. The outer liner portion 118 may further include an outer liner aperture 137 for receiving the inner liner portion 116, where the centre axis of the outer liner aperture 137 and the outer liner portion 118 is collinear with the axis P-P.

Figure 6:
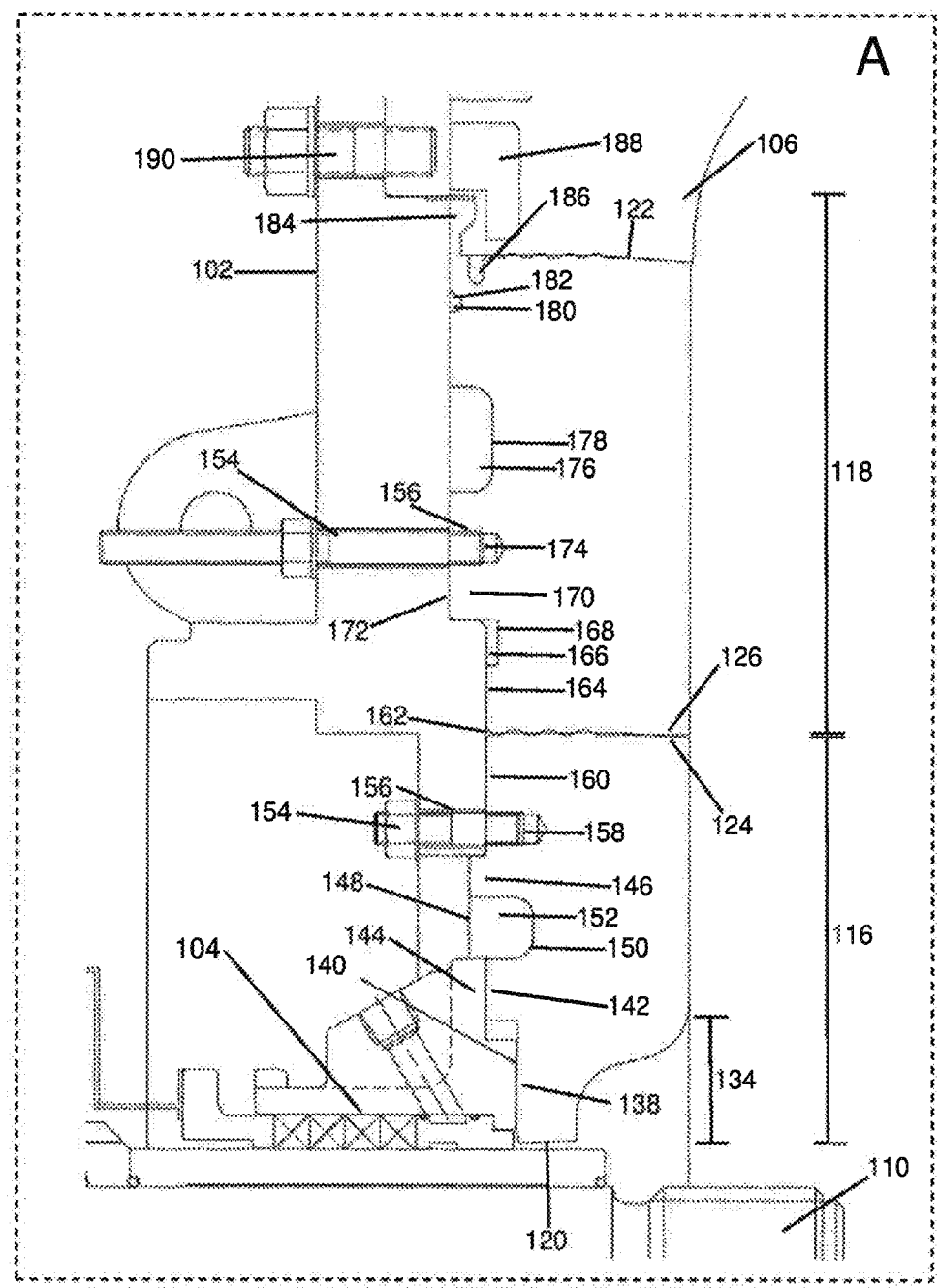
FIG. 6 illustrates a detailed view of area A illustrating an embodiment of the present invention.
Figure 7:
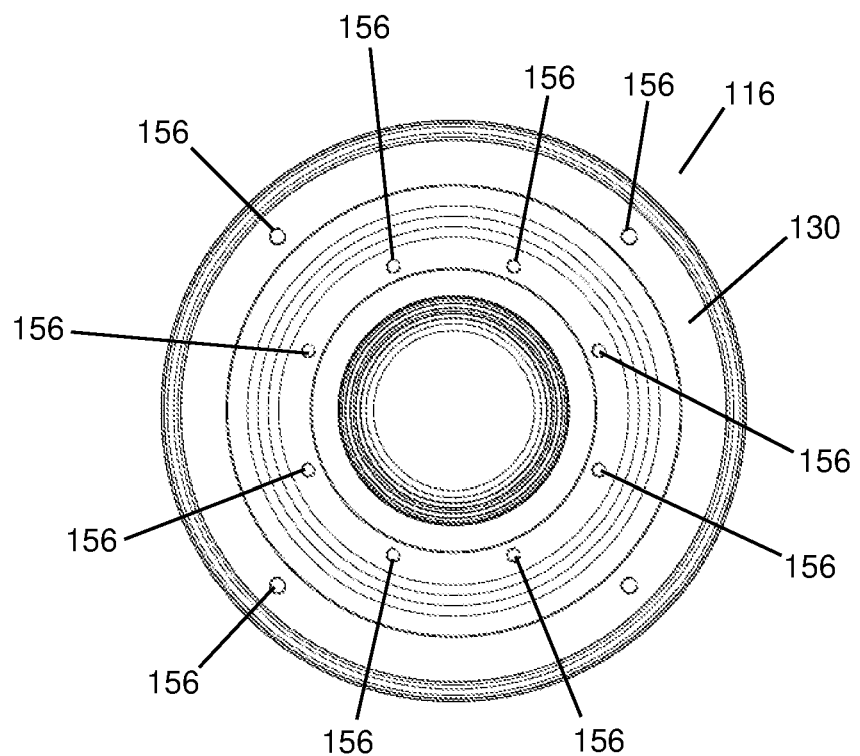
FIG. 7 illustrates a top view of an embodiment of the present invention.
Figure 8:
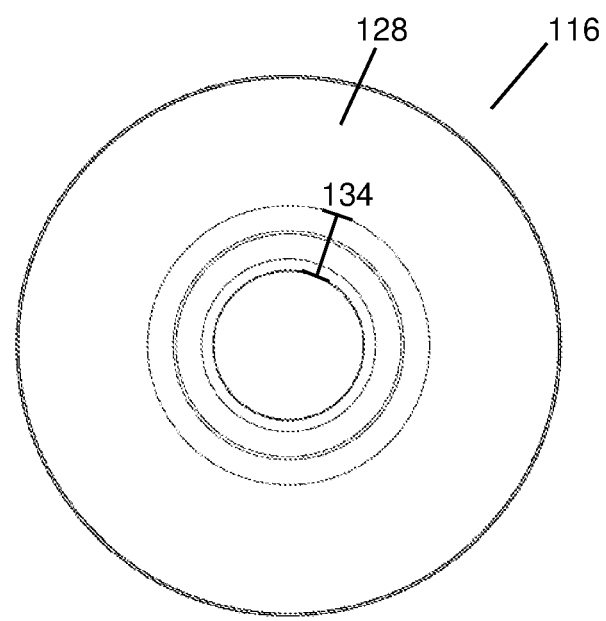
FIG. 8 illustrates a bottom view of an embodiment of the present invention.
Figure 9:
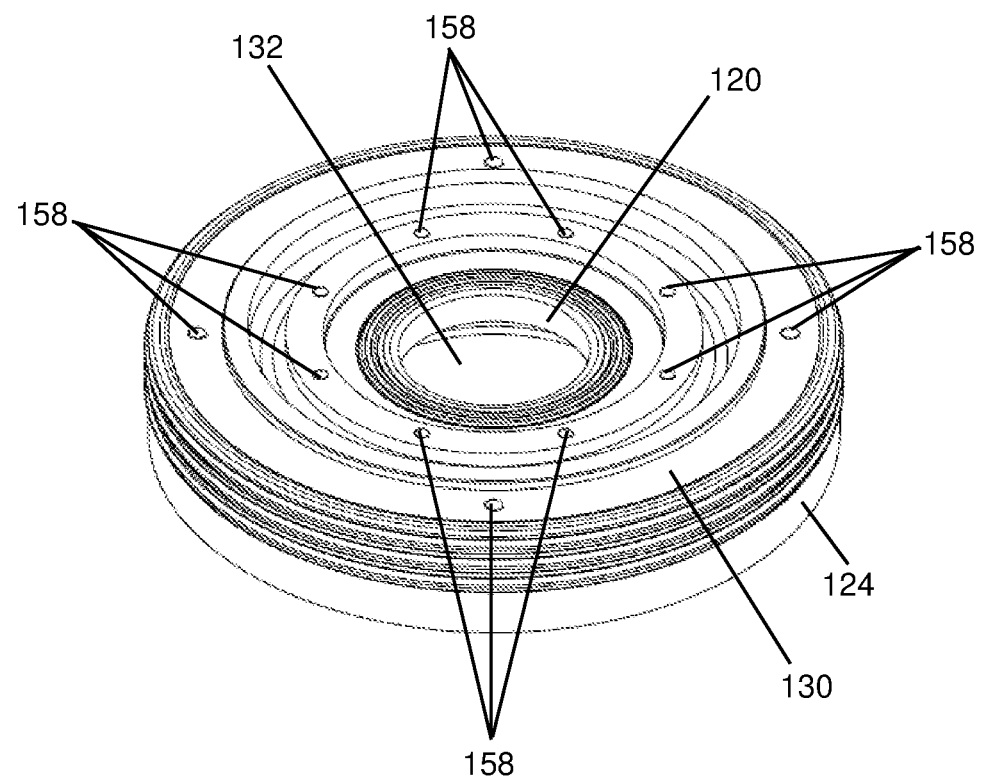
FIG. 9 illustrates a top perspective view of an embodiment of the present invention.
Figure 10:
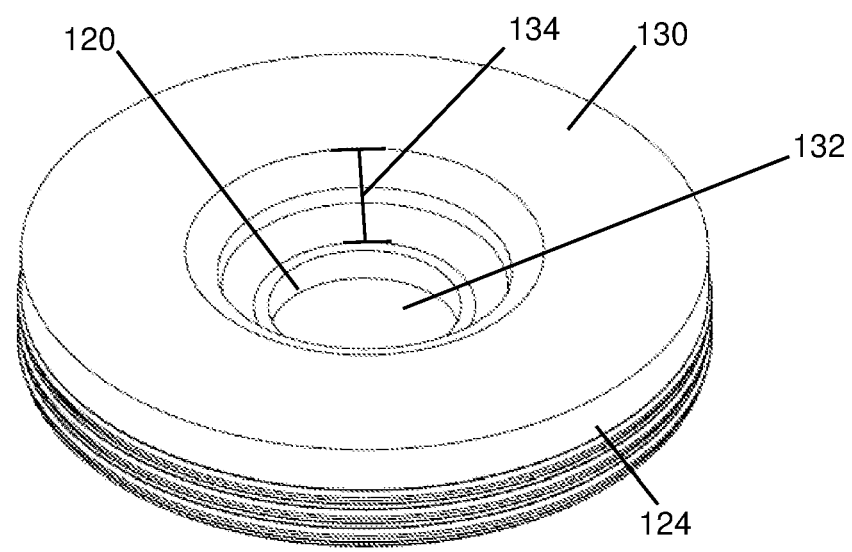
FIG. 10 illustrates a bottom perspective view of an embodiment of the present invention.
Figure 11:
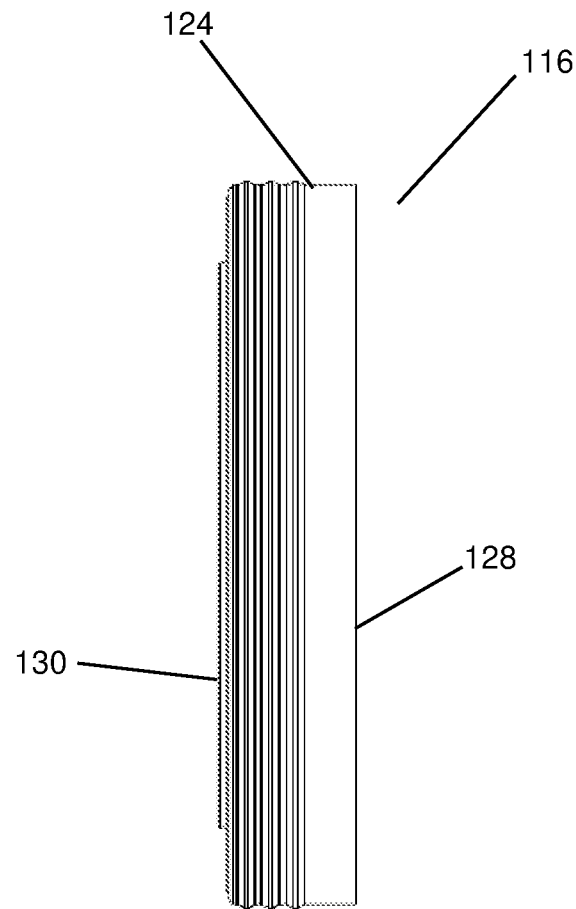
FIG. 11 illustrates a side view of an embodiment of the present invention.
Figure 12:
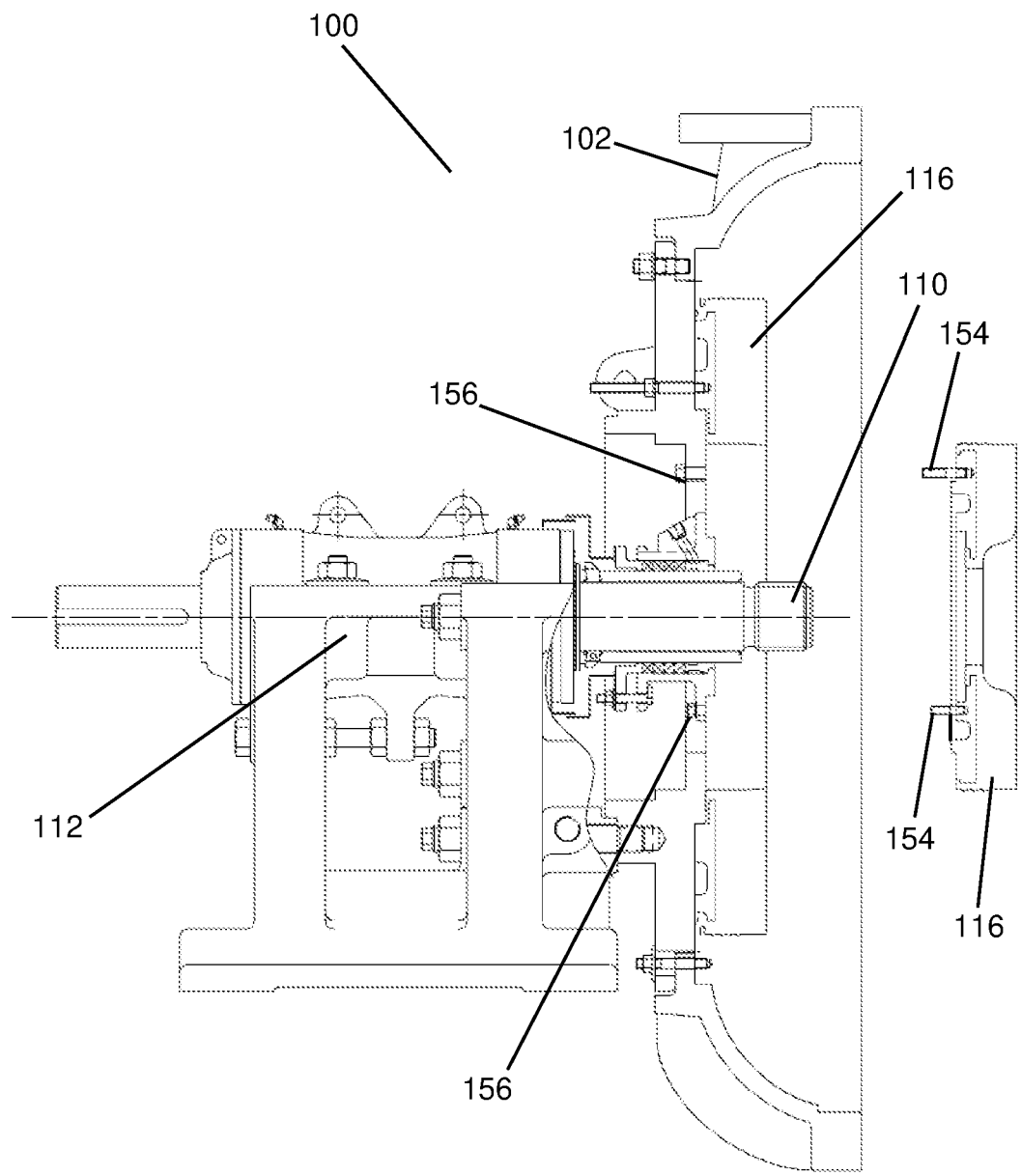
FIG. 12 illustrates a side section view of an embodiment of the present invention.
Figure 13:
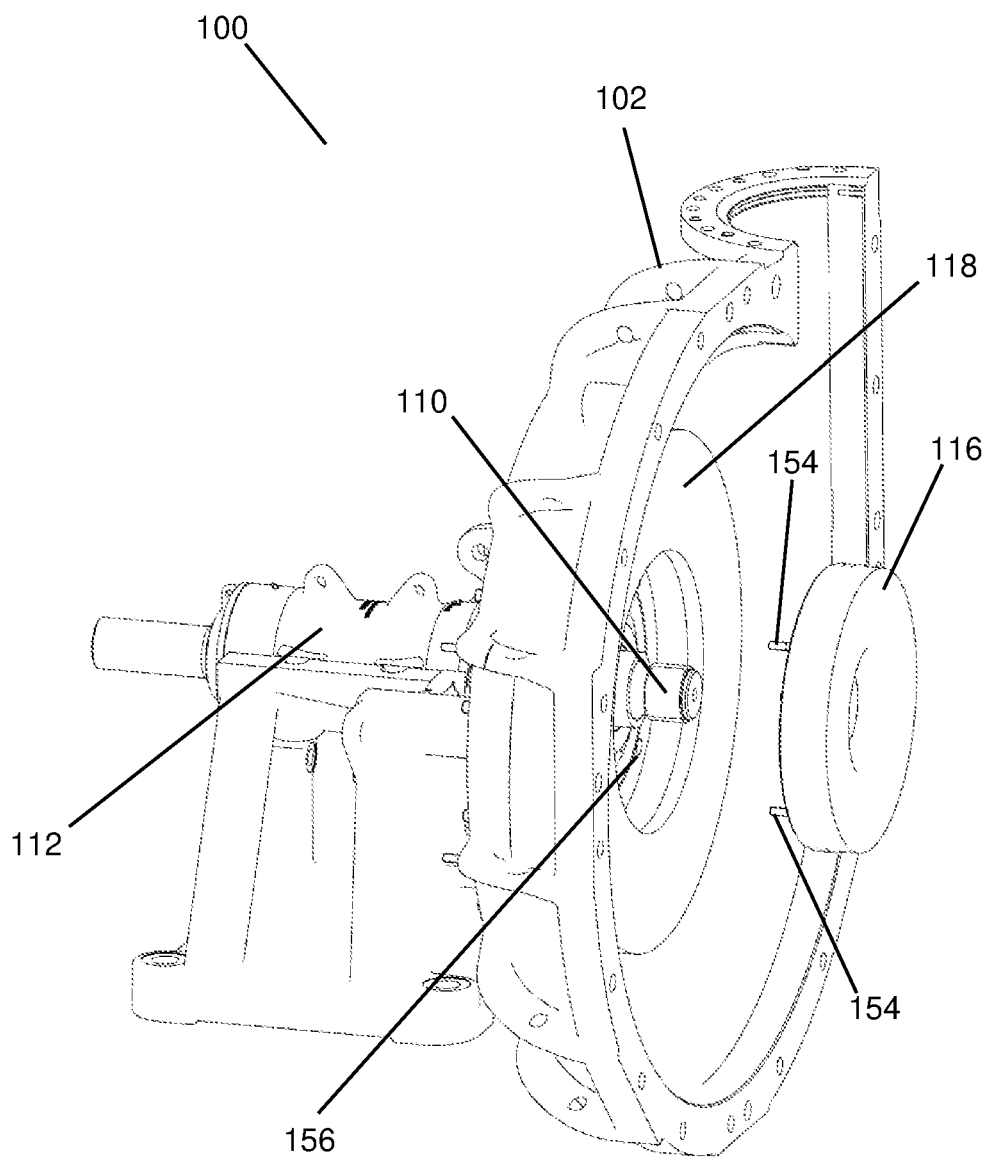
FIG. 13 illustrates a side-on perspective view of an embodiment of the present invention.
Figure 14:
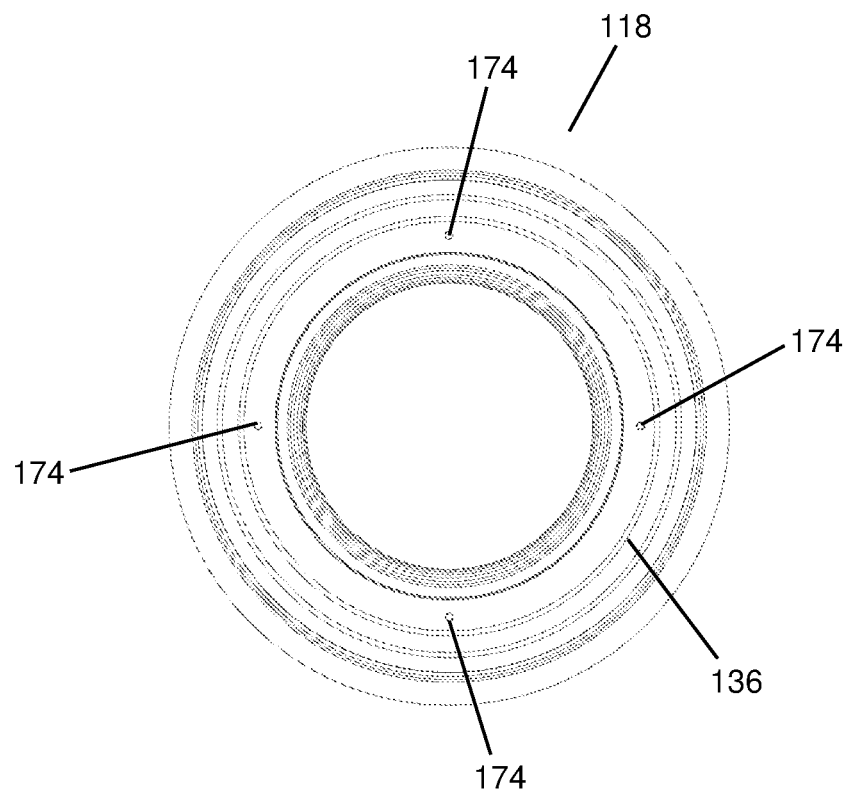
FIG. 14 illustrates a top view of an embodiment of the present invention.
Figure 15:
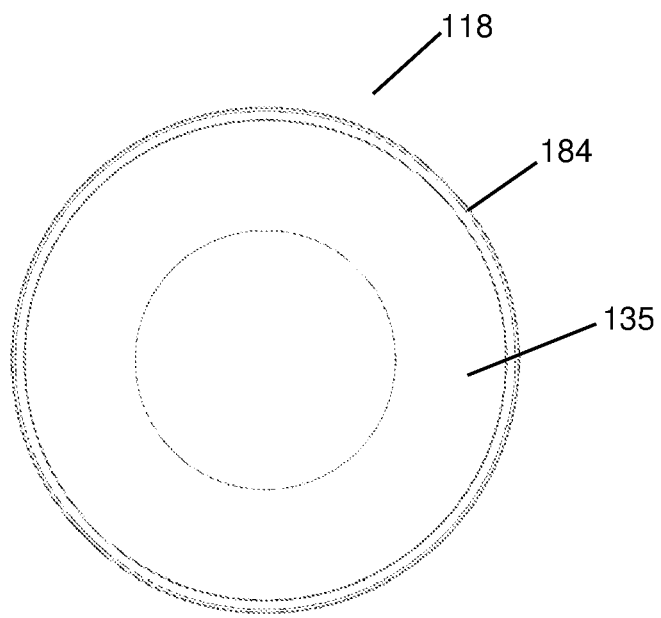
FIG. 15 illustrates a bottom view of an embodiment of the present invention.
Figure 16:
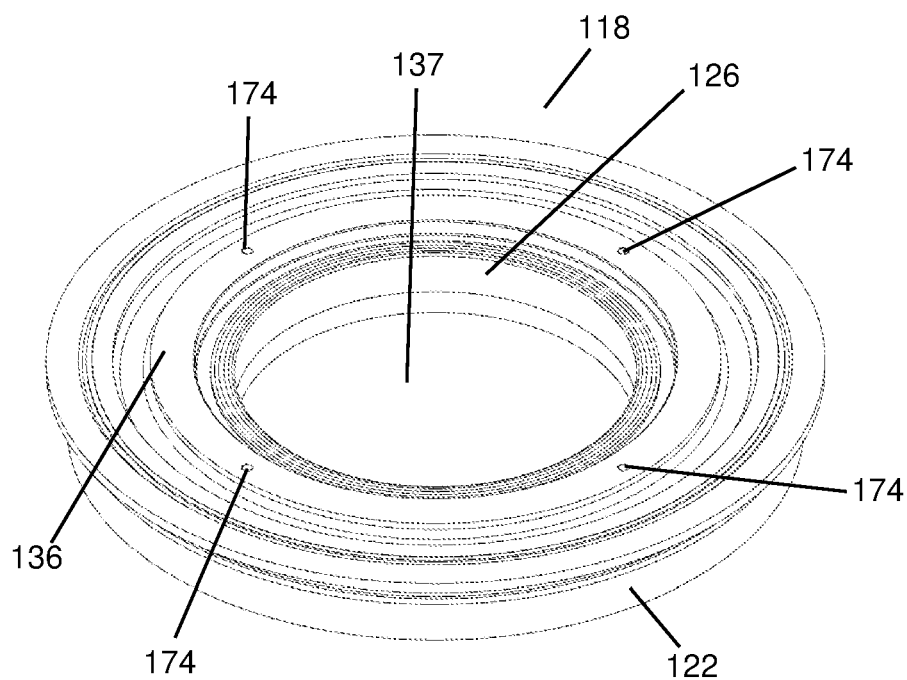
FIG. 16 illustrates a top perspective view of an embodiment of the present invention.
Figure 17:
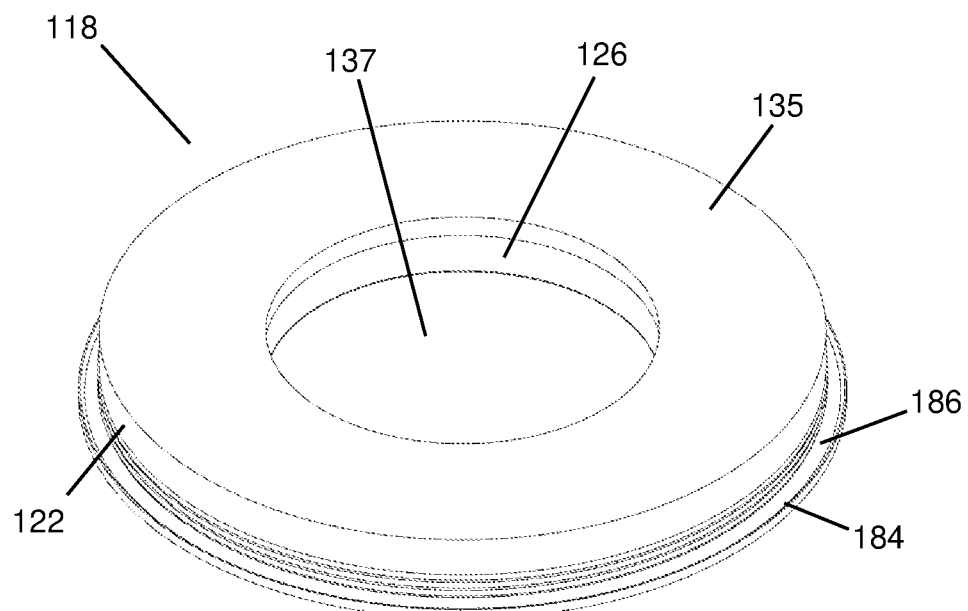
FIG. 17 illustrates a bottom perspective view of an embodiment of the present invention.
Figure 18:
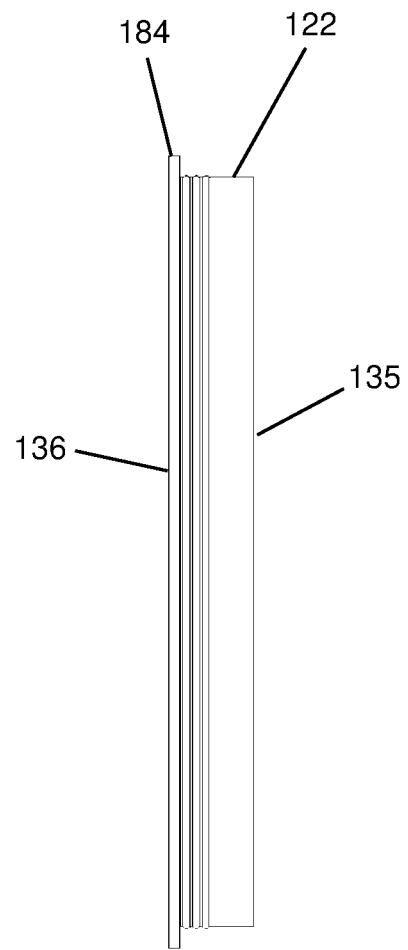
FIG. 18 illustrates a side view of an embodiment of the present invention.

The inner liner engagement face 130 and an outer liner engagement face 136 provided on the drive side of the inner liner portion 116 and outer liner portion 118 respectively may be formed with various features to enable alignment and engagement with the outer casing 102 of the pump 100. For example, when viewed in a section view as shown in FIG. 6, the inner liner engagement face 130 and the outer liner engagement face 136 and the inner surface of the outer casing 102 may include various corresponding planes, protrusions and recesses that enable the inner liner portion 116 to be aligned with respect to the drive shaft 110 and the inner surface of the outer casing 102 and allow the inner liner portion 116 to form the inner seal with the drive shaft seal 104. Further, these features also enable alignment of the outer liner portion 118 with the inner liner portion 116 and the inner surface of the outer casing 102.

An example of an arrangement of the inner liner engagement face 130 and outer liner engagement face in engagement with the inner surface of the outer casing 102 is provided in FIG. 6. In the example, the features of the inner liner engagement face 130 and the outer liner engagement face 136 are generally described in an order moving from the sealing face 120 of the inner liner portion 116 to the outer face 122 of outer liner portion 118. The sealing face 120 is arranged to contact and seal against the drive shaft seal 104. To ensure the sealed contact, the inner liner engagement face 130 may include a first liner plane 138 that contacts against a first casing plane 140 of the outer casing 102.

The inner liner engagement face 130 may further include a first liner protrusion 142 that is received within and contacts against a first casing recess 144 formed in the outer casing 102. The inner liner engagement face 130 may further include a second liner protrusion 146 configured to protrude and contact against a second casing plane 148, formed by the outer casing 102. Between the first liner protrusion 142 and the second liner protrusion 146 there is provided a first liner recess 150 that forms a first pocket 152, which is provided to reduce the weight of the inner liner portion 116 without compromising its structural integrity.

Further, in an embodiment, the pump 100 may include a plurality of fasteners 154. The fasteners 154 may be provided to fix the inner liner portion 116 to the outer casing 102 in the alignment provided by the inner engagement surface 130. The at least one fastener 154 is arranged pass through at least one casing aperture 156 provided in the casing and into inner liner apertures 158 provided in the inner liner portion 116. The at least one fastener 154 holds the inner liner portion 116 and the outer casing 102 together in the position of alignment provided by the inner liner engagement face 130. In an example, the fasteners 154 may include threaded screws or bolts that are receivable and engageable by a tapped surface within the inner liner apertures 158.

The inner liner engagement face 130 may further include a second liner plane 160 that contacts against a third casing plane 162, where the third casing plane 162 may be slightly recessed from the second casing plane 148. Thus, in light of the above, the various features of the inner engagement surface 130 and the corresponding features of the inner surface of the outer casing 102 cooperatively align the inner liner portion 116 with respect to the drive shaft 110 and the draft shaft seal 104 and this alignment is maintained by at least one fastener 154 holding the outer casing 102 and the inner liner 116 together.

As described above, the outer face 124 of inner liner portion 116 and the inner face 126 of the outer liner portion 118 are in sealed engagement with one another providing the inter-liner seal. When so engaged, the second liner plane 160 is adjacent to a third liner plane 164 provided to the outer liner engagement face 136. That is, when engaged, both the second liner plane 160 and the adjacent third liner plane 164 are arranged to both contact the third casing plane 162.

The outer liner engagement face 136 may further include a second pocket 166 formed by a second liner recess 168, wherein the pocket 166 is provided to reduce the weight of the outer liner portion 118 without compromising its structural integrity. Further, the outer liner engagement face 136 may also include a fourth liner plane 170 that is in contact with a fourth casing plane 172, wherein the fourth liner plane 170 protrudes towards the drive side relative to the third liner plane 164.

In an embodiment, the fasteners 154 may also be arranged to fix the outer liner portion 118 to the outer casing 102 in the alignment provided by the outer liner engagement face 136. The fasteners 154 may pass through the at least one casing aperture 156 provided in the outer casing 102 and into outer liner apertures 174 provided in the outer liner portion 118. The at least one fastener 154 holds the outer liner portion 118 and the outer casing 102 together. In an example, the fasteners 154 may include threaded screws or bolts that are receivable and engageable by a tapped surface within the outer liner apertures 174.

The outer liner engagement face 136 may also include a third pocket 176 formed by a third liner recess 178 and a fourth pocket 180 formed by a third liner recess 182, wherein the third pocket 176 and fourth pocket 180 are provided to reduce the weight of the outer liner portion 118 without compromising its structural integrity. Moreover, the outer liner engagement face 136 may also include an engagement flange 184 arranged to contact the fourth casing plane 172. Further the outer face 124 of the outer liner portion 118 may also include a flange recess 186.

When, the outer face 124 of inner liner portion 116 and the inner face 126 of the outer liner portion 118 are engaged together, the alignment of the inner liner portion 116 with respect to the drive shaft 110 and drive shaft seal 104 accordingly enables alignment of the outer liner portion 118. That is, the inner liner portion 116 aligns to the drive shaft 100 and drive shaft seal 104 and the outer liner portion 118 aligns to the inner liner portion 116. Once so aligned, the fasteners 154 maintain the correct alignment by connecting the drive side liner 114 to the outer casing 102.

In other words, the inner liner engagement face 130 may include at least one inner liner alignment feature. The at least one inner liner alignment feature is arranged to engage with at least one casing alignment feature that, when engaged with one another, align the inner liner portion with respect to the drive shaft. Further, the inner liner portion 116 is maintained in alignment with the drive shaft 110 by means of at least one fastener 154 attaching the inner liner portion 116 to the outer casing 102. Furthermore, the outer liner engagement face 136 may include at least one outer liner alignment feature arranged to engage with another at least one casing alignment feature that aligns the outer liner portion 118 with respect to the inner liner portion 116. Moreover, the outer liner portion 118 is maintained in alignment with the inner liner portion 116 by means of another at least one fastener 154 attaching the outer liner portion 118 to the outer casing 102. It is understood that the "alignment features" for either of the inner liner portion, the outer liner portion or the casing are understood to refer to any arrangement including at least one or any of the protrusions, recesses or planes as described above.

When in position, the main liner 106 may be installed in the pump 100. The main liner 106 may be configured to include an engagement lip 188 that shaped to correspond to and engage with the engagement flange 184. Further, a main liner fastener 190 may be provided to hold the main liner 106 in engagement with the outer casing 102, and in doing so, also maintain the outer liner portion 118 in position with the outer casing 102. That is, the main liner 106 may be arranged to align and engage with the outer liner portion 118 and be maintained in alignment and engagement by means of at least one main liner fastener 190 attaching the main liner 106 to the outer casing 102.

In the above description, the terms "protrusion", "plane" and "recess" are relative terms that describe the step-wise undulations or flat sections of the surface of the inner liner engagement face 130 and the outer liner engagement face 164. The terms are used to describe the features of in the invention and aid the reader understanding the workings of these interlocking protruding, receding and planar features, and as such, are not to be taken as limiting. Further it would be understood that the protruding, recessing and planar features extend around the inner engagement face 130 and outer engagement face 134 as circular protruding lips, recesses or planes. Moreover, it is understood within the context of the specification a "protrusion" describes a section of the inner and outer engagement faces 130 136 that protrudes relative to the preceding section, a "recess" describes a section of the inner and outer engagement faces 130 136 that recedes relative to the preceding section a "plane" is a portion that remains substantially flat.

Figure 19:
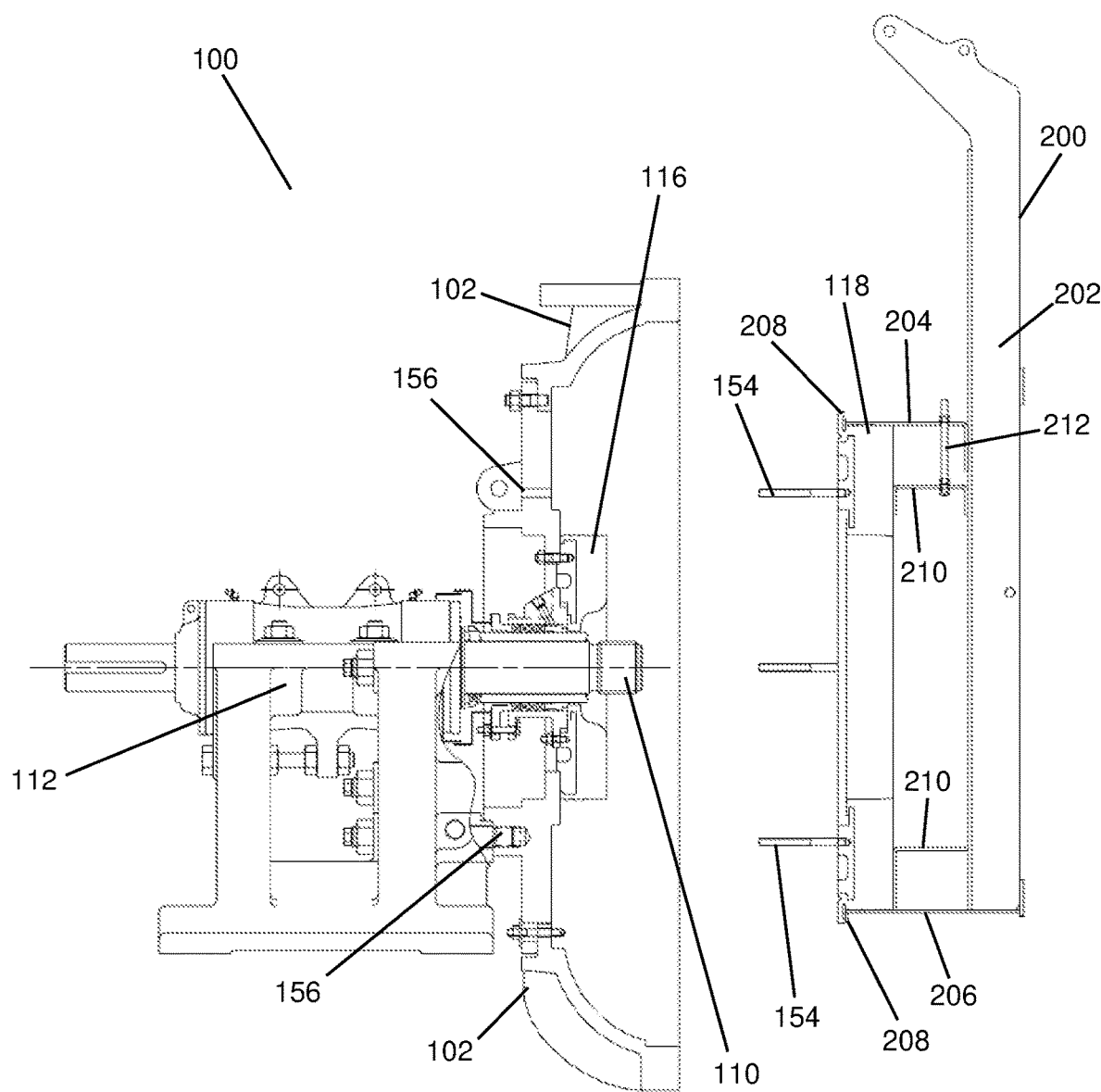
FIG. 19 illustrates a side section view of an embodiment of the present invention.
Figure 20:
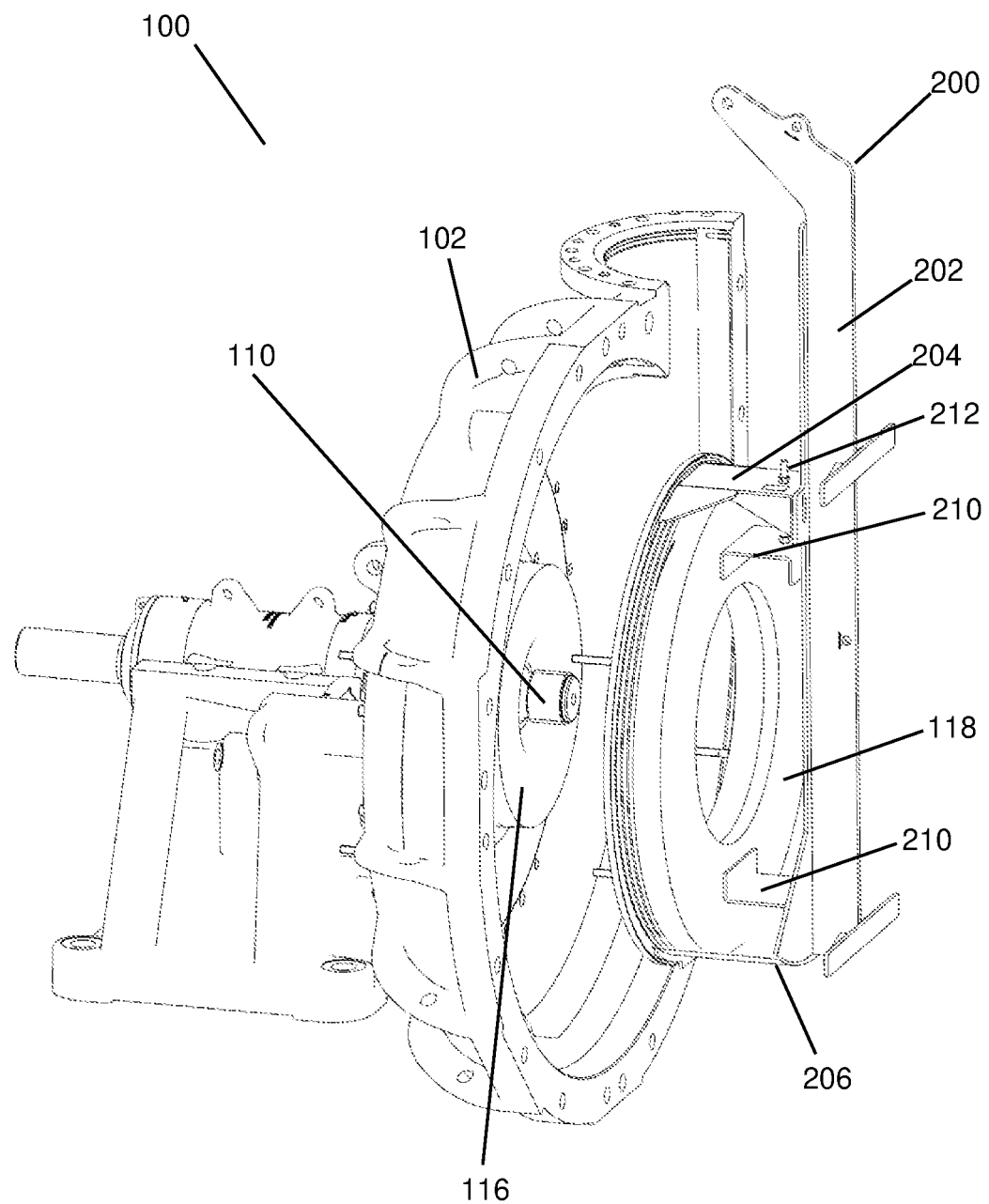
FIG. 20 illustrates a side-on perspective view of an embodiment of the present invention.
Figure 21:
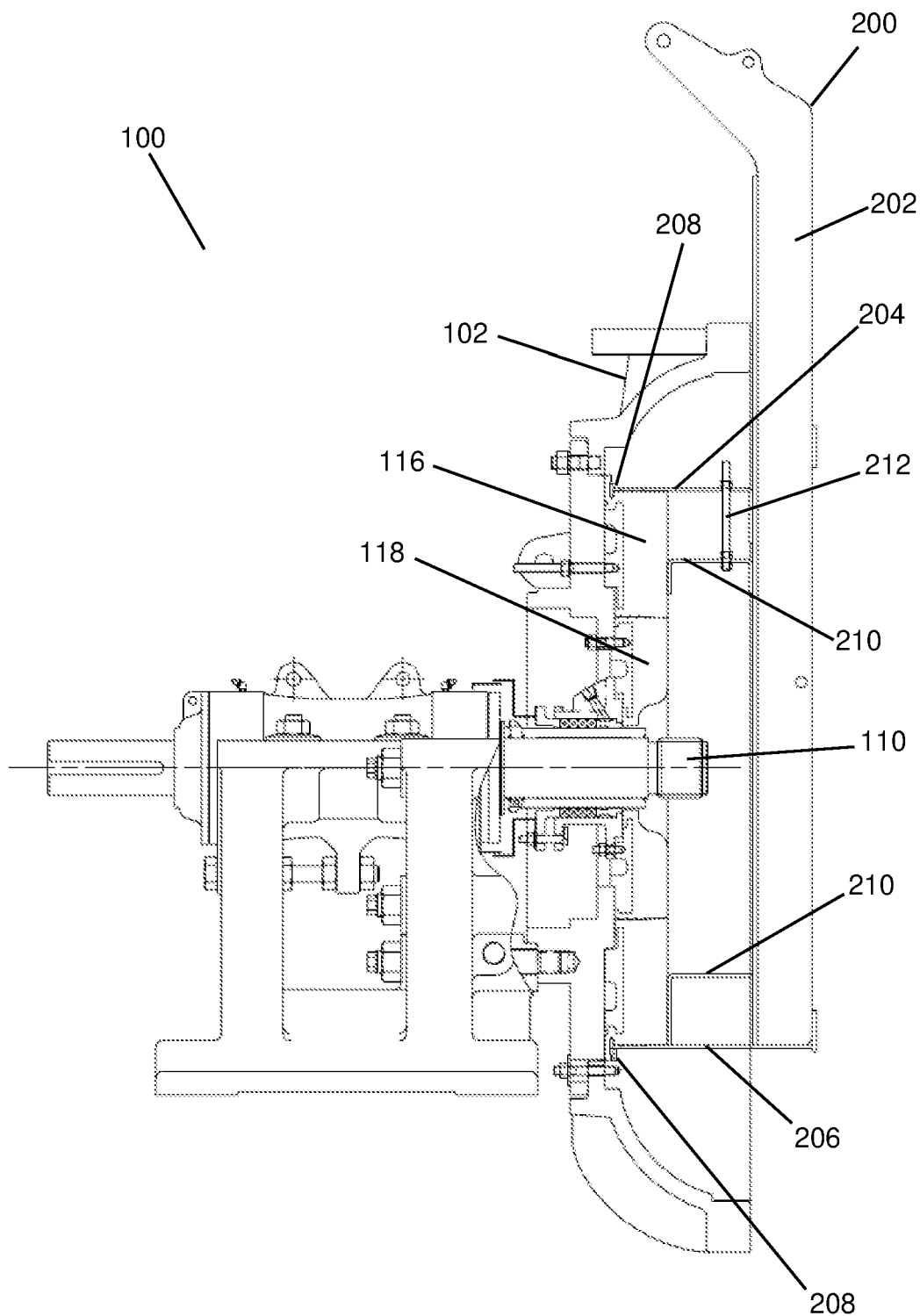
FIG. 21 illustrates a side section view of an embodiment of the present invention.

Referring to FIGS. 19 to 21, there is provided an embodiment for a tool 200 for the pump 100. The tool 200 is arranged to engage the outer liner portion 118 and enable its removal, installation or positioning. The tool 200 may include a lifting member 202, where the lifting member 202 includes a top arm 204 and a bottom arm 206. Each end of each arm 204, 206 is arranged to engage along the curved shape of the engagement flange 184 provided to the periphery of the outer liner portion 118. The end of each arm 204, 206 may include an engagement finger 208 that is arranged to engage with the engagement flange 184. That is, the engagement finger 208 may be shaped and sized to be received within the flange recess 186 provided around the edge of the outer face 122 of the outer portion 118.

In an embodiment, the lifting member 202 further includes at least one support bracket 210 that is arranged to contact and support the outer liner wear face 135 when the tool 200 is engaged with the outer liner portion 118. The at least one support brackets 210 may include "L" shaped brackets, where the lower portion of the "L" shape is in contact with and presses against the outer liner wear face 135. By pressing against the outer liner wear face 135, the at least one support brackets 210 keep the outer liner portion 118 in engagement with the engagement finger 208, and thus is held up or retained by the tool 200.

In an embodiment, the top arm 204 may be adjustable relative to the lifting member 202 and the at least one support bracket 210. This may be facilitated by an adjustable pin 212 that passes through both the top arm 204 and the at least one support bracket 210. The adjustable pin 212 may be arranged to hold the top arm 204 and at least one support bracket 210 in an engaged position with respect to the outer liner portion 118.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "above" and "below" "top" and "bottom", and the like are used as words of convenience to provide reference points and are not to be construed as limiting terms.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth. Although a preferred embodiment has been described in detail, it should be understood that modifications, changes, substitutions or alterations will be apparent to those skilled in the art without departing from the scope of the present invention.

As used herein, a, an, the, at least one, and one or more are used interchangeably, and refer to one or to more than one (i.e. at least one) of the grammatical object. By way of example, "an element" means one element, at least one element, or one or more elements. In the context of this specification, the term "about" is understood to refer to a range of numbers that a person of skill in the art would consider equivalent to the recited value in the context of achieving the same function or result.

Advantages

The embodiments described herein provide a novel means of replacing portions of a drive side liner. It is common that during use, the outer sections of a drive side liner experience more wear than the inner sections. This results in localised wear causing the formation of pockets or recesses in the outer portions of the drive side liners whilst the inner portions remain usable. The present invention enables for the higher wear areas (i.e. the outer liner portion) to be removed for replacement, repair or inspection and keeping the areas of reduced wear (i.e. the inner liner portion) in place and no compromising the inner seal.

Further, the above embodiments provide a means to allow the position of the outer liner portion 118 to be adjusted along the axis P-P independently of the inner liner portion 116 and whilst still enabling the inner seal to remain intact.

Further, the design of the drive side liner ensures that when the inner liner portion or the outer liner portions are removed, the other portion remains in position and sealed with the outer casing. This prevents wear and damage to the inner surface of the outer casing from slurry and other pumped material from escaping the pumping chamber and locating along the drive shaft or between the liners and the outer casing. Further, if the drive shaft seal provided to the drive shaft needs to be replaced, the inner liner portion can be removed without disturbing the outer liner portion. This in turn minimises any re-alignment issues when the inner liner portion is reinstalled.

Moreover, the custom tool also herein described aids in the installation, removal and/or positioning of the larger and heavier outer liner portion. This reduces the likelihood of injury to pump maintenance personnel and reduces the downtime for maintenance.

| List of parts |
| --- |
| 100 - pump |
| 102 - outer casing |
| 104 - drive shaft seal |
| 106 - main liner |
| 108 - pumping chamber |
| 110 - drive shaft |
| 112 - motor |
| 114 - drive side liner |
| 116 - inner liner portion |
| 118 - outer liner portion |
| 120 - sealing face |
| 122 - outer face of outer liner portion |
| 124 - outer face of inner liner portion |
| 126 - inner face of outer liner portion |
| 128 - inner liner wear face |
| 130 - inner liner engagement face |
| 132 - central aperture |
| 134 - contoured region |
| 135 - outer liner wear face |
| 136 - outer liner engagement face |
| 137 - outer liner aperture |
| 138 - first liner plane |
| 140 - first casing plane |
| 142 - first liner protrusion |
| 144 - first casing recess |
| 146 - second liner protrusion |
| 148 - second casing plane |
| 150 - first liner recess |

| List of parts |
| --- |
| 152 - first pocket |
| 154 - at least one fastener |
| 156 - at least one casing aperture |
| 158 - at least one inner liner aperture |
| 160 - second liner plane |
| 162 - third casing plane |
| 164 - third liner plane |
| 166 - second pocket |
| 168 - second liner recess |
| 170 - fourth liner plane |
| 172 - fourth casing plane |
| 174 - outer liner aperture |
| 176 - third pocket |
| 178 - third liner recess |
| 180 - fourth pocket |
| 182 - fourth liner recess |
| 184 - engagement flange |
| 186 - flange recess |
| 188 - engagement lip |
| 190 - main liner fastener |
| 200 - tool |
| 202 - lifting member |
| 204 - top arm |
| 206 - bottom arm |
| 208 - engagement finger |
| 210 - at least one support bracket |
| 212 - adjustable pin |

The invention claimed is:

1. A drive side liner for a centrifugal slurry pump, wherein the centrifugal slurry pump includes an outer casing, a main liner and an impeller driven by a drive shaft, wherein the main liner and drive side liner are housed within the outer casing of the centrifugal slurry pump, the drive side liner including:

an inner liner portion including a central aperture configured to receive the drive shaft and wherein a sealing face of the inner liner portion is arranged to contact a drive shaft seal to form an inner seal, the drive side liner further including an outer liner portion arranged to surround the inner liner portion, the outer liner portion having an outer face that is arranged to contact the outer casing and/or the main liner to form an outer seal, wherein the inner liner portion and the outer liner portion are each configured to removably engage with one another and the outer casing and wherein the outer liner portion is arranged to be removable from the outer casing and the inner liner portion without compromising the inner seal, and wherein the inner liner portion is arranged to be removable from the drive shaft and the outer liner portion without compromising the outer seal.

2. The drive side liner in accordance with claim 1, wherein the outer face of the inner liner portion is arranged to contact an inner face of the outer liner portion to form an intermediate seal.

3. The drive side liner in accordance with claim 1, wherein the inner liner portion includes an inner liner wear face and an inner liner engagement face on opposing sides of the inner liner portion.

4. The drive side liner in accordance with claim 3, wherein the inner liner wear face is a smooth surface arranged to face the impeller when in use.

5. The drive side liner in accordance with claim 4, wherein the inner liner engagement face includes at least one inner liner alignment feature arranged to engage with at least one casing alignment feature that, when engaged with one another, align the inner liner portion with respect to the drive shaft.

6. The drive side liner in accordance with claim 5, wherein the inner liner portion is maintained in alignment with the drive shaft by means of at least one fastener attaching the inner liner portion to the outer casing.

7. The drive side liner in accordance with claim 6, wherein the outer liner portion includes an outer liner wear face and an outer liner engagement face on opposing sides of the outer liner portion.

8. The drive side liner in accordance with claim 7, wherein the outer liner wear face is a smooth surface arranged to face the impeller.

9. The drive side liner in accordance with claim 8, wherein the outer liner engagement face includes at least one outer liner alignment feature arranged to engage with another at least one casing alignment feature that aligns the outer liner portion with respect to the inner liner portion.

10. The drive side liner in accordance with claim 9, wherein the outer liner portion is maintained in alignment with the inner liner portion by means of another at least one fastener attaching the outer liner portion to the outer casing.

11. The drive side liner in accordance with claim 10, wherein the main liner is arranged to align and engage with the outer liner portion and to be maintained in alignment and engagement by means of at least one main liner fastener attaching the main liner to the outer casing.

\* \* \* \* \*